(12) United States Patent
Shin (10) Patent No.: US 8,989,248 B2
(45) Date of Patent: Mar. 24, 2015

(54) SYSTEM AND METHOD FOR DETECTING VICTIM SIGNAL IN MB-OFDM UWB COMMUNICATION SYSTEM

(75) Inventor: Cheol-ho Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 763 days.

(21) Appl. No.: 13/228,173

(22) Filed: Sep. 8, 2011

(65) Prior Publication Data

US 2012/0057618 A1 Mar. 8, 2012

(30) Foreign Application Priority Data

Sep. 8, 2010 (KR) .................. 10-2010-0088123

(51) Int. Cl.
| | |
|---|---|
| *H04B 3/46* | (2006.01) |
| *H04L 27/06* | (2006.01) |
| *H04J 11/00* | (2006.01) |
| *H04L 5/00* | (2006.01) |

(52) U.S. Cl.
CPC ............ *H04J 11/003* (2013.01); *H04L 5/0007* (2013.01)
USPC .......................................... 375/228; 375/340

(58) Field of Classification Search
CPC ............... H04B 1/719; H04B 17/0057; H04B 17/0042; H04B 17/005; H04B 1/715; H04B 2001/7154; H04W 52/0245; H04W 72/085; A61B 5/7203; G01S 7/023; H04K 3/20

USPC ........... 375/227, 228, 316, 346, 340; 370/210
See application file for complete search history.

(56) References Cited

U.S. PATENT DOCUMENTS

| | | | |
|---|---|---|---|
| 7,822,430 B2 | 10/2010 | Yoon et al. | |
| 8,300,676 B2 | 10/2012 | Shin et al. | |
| 2007/0147236 A1 | 6/2007 | Lee | |
| 2008/0006918 A1 | 1/2008 | Nagatanini | |
| 2010/0249633 A1* | 9/2010 | Droitcour et al. | 600/534 |

FOREIGN PATENT DOCUMENTS

| | | |
|---|---|---|
| JP | 2007-166068 | 6/2007 |
| KR | 10-0766041 | 10/2007 |
| KR | 10-0806870 | 2/2008 |
| KR | 10-2009-0020767 | 2/2009 |
| KR | 10-2010-0056331 | 5/2010 |
| WO | 03/071728 A2 | 8/2003 |
| WO | 2010/009004 A2 | 1/2010 |

\* cited by examiner

*Primary Examiner* — Tesfaldet Bocure
(74) *Attorney, Agent, or Firm* — Nelson Mullins Riley & Scarborough LLP (57) ABSTRACT

To detect a victim signal in an ultra wideband communication system, fast Fourier transform of a received signal including a plurality of time symbols is performed to generate a signal including a plurality of frequency symbols, it is determined whether a first signal is present in a first region of the signal, and if a first signal is present, the first signal is detected as a first victim signal. Next, an error signal is generated based on the signal including the plurality of frequency symbols, it is determined whether a second signal is present in a second region of the error signal, and if a second signal is present, the second signal is detected as a second victim signal.

15 Claims, 11 Drawing Sheets

| SNR | -6 | -3 | 0 | 3 | 6 | 9 | 12 | 15 | 18 | 21 | 24 | 27 | 30 | 33 | 36 | 39 | 42 | 45 | 48 |
|---|---|---|---|---|---|---|---|---|---|---|---|---|---|---|---|---|---|---|---|
| performance | 1.0000 | 1.0000 | 1.0000 | 1.0000 | 1.0000 | 0.9810 | 0.4160 | 0.1410 | 0.0000 | 0.0000 | 0.0000 | 0.0000 | 0.0000 | 0.0000 | 0.0000 | 0.0000 | 0.0000 | 0.0000 | 0.0000 |
| DFL_1 | 1.0000 | 1.0000 | 1.0000 | 1.0000 | 1.0000 | 0.9990 | 0.9970 | 0.9970 | 0.9980 | 0.9370 | 0.8020 | 0.5490 | 0.2460 | 0.0600 | 0.0060 | 0.0000 | 0.0000 | 0.0000 | 0.0000 |
| DFL_3 | 1.0000 | 1.0000 | 1.0000 | 1.0000 | 1.0000 | 1.0000 | 1.0000 | 1.0000 | 1.0000 | 1.0000 | 0.9930 | 0.9810 | 0.5752 | 0.1623 | 0.0180 | 0.0000 | 0.0000 | 0.0000 | 0.0000 |
| DFL_5 | 1.0000 | 1.0000 | 1.0000 | 1.0000 | 1.0000 | 1.0000 | 1.0000 | 1.0000 | 1.0000 | 1.0000 | 0.9990 | 0.9659 | 0.7530 | 0.2540 | 0.0301 | 0.0000 | 0.0000 | 0.0000 | 0.0000 |
| DFL_7 | 1.0000 | 1.0000 | 1.0000 | 1.0000 | 1.0000 | 1.0000 | 1.0000 | 1.0000 | 1.0000 | 1.0000 | 1.0000 | 0.9829 | 0.8632 | 0.3380 | 0.0423 | 0.0000 | 0.0000 | 0.0000 | 0.0000 |
| DFL_9 | 1.0000 | 1.0000 | 1.0000 | 1.0000 | 1.0000 | 1.0000 | 1.0000 | 1.0000 | 1.0000 | 1.0000 | 1.0000 | 0.9919 | 0.9294 | 0.4153 | 0.0544 | 0.0000 | 0.0000 | 0.0000 | 0.0000 |
| DFH_1 | 0.4860 | 0.4710 | 0.4360 | 0.3740 | 0.3700 | 0.3700 | 0.3750 | 0.4280 | 0.5040 | 0.4730 | 0.5100 | 0.5970 | 0.6460 | 0.7870 | 0.8200 | 0.8780 | 0.8400 | 0.6990 | 0.5060 |
| DFH_3 | 0.8768 | 0.8427 | 0.8257 | 0.7605 | 0.7585 | 0.7756 | 0.7715 | 0.8146 | 0.8697 | 0.8507 | 0.8888 | 0.9379 | 0.9649 | 0.9940 | 1.0000 | 0.9990 | 0.9940 | 0.9800 | 0.8878 |
| DFH_5 | 0.9819 | 0.9558 | 0.9478 | 0.9016 | 0.9006 | 0.9237 | 0.9086 | 0.9357 | 0.9608 | 0.9639 | 0.9709 | 0.9970 | 0.9970 | 1.0000 | 1.0000 | 1.0000 | 1.0000 | 0.9990 | 0.9719 |
| DFH_7 | 0.9980 | 0.9889 | 0.9930 | 0.9598 | 0.9638 | 0.9738 | 0.9598 | 0.9708 | 0.9909 | 0.9899 | 0.9899 | 1.0000 | 1.0000 | 1.0000 | 1.0000 | 1.0000 | 1.0000 | 1.0000 | 0.9960 |
| DFH_9 | 1.0000 | 0.9970 | 0.9970 | 0.9849 | 0.9879 | 0.9909 | 0.9798 | 0.9859 | 1.0000 | 0.9970 | 0.9960 | 1.0000 | 1.0000 | 1.0000 | 1.0000 | 1.0000 | 1.0000 | 1.0000 | 1.0000 |

SYSTEM AND METHOD FOR DETECTING VICTIM SIGNAL IN MB-OFDM UWB COMMUNICATION SYSTEM

CROSS-REFERENCE TO RELATED APPLICATION

This application claims priority to and the benefit of Korean Patent Application No. 10-2010-0088123 filed in the Korean Intellectual Property Office on Sep. 8, 2010, the entire contents of which are incorporated herein by reference.

BACKGROUND OF THE INVENTION (a) Field of the Invention

The present invention relates to a method for detecting a victim signal in a multi-band orthogonal frequency division multiplexing ultra wideband communication system.

(b) Description of the Related Art

For the use of UWB (Ultra Wide Band) systems in a particular frequency band to protect communication systems that exist or will be introduced in the future, a technology standard regulates that other communication signal of a certain level is to be detected and measures are to be taken to protect the detected communication signal. There are no specific worldwide common standards on the type of victim signal, a victim detection level, etc. to apply such a DAA (Detect And Avoid) technology standard to an actual communication system. Also, a victim communication system to be protected, a victim detection level for applying the avoid technology to UWB, and so on are differently set according to different countries.

The detect and avoid technology standard, as discussed so far, is mainly about an avoid algorithm that sets a victim signal detection level for protecting a victim signal and is applicable according to the victim signal detection level. For example, there is an avoid algorithm that, if a packet error rate received by MAC (Medium Access Control) is higher than a reference value, discriminates whether the packet error rate comes from other UWB device or other communication equipment and then performs an interference avoiding operation.

Moreover, to prevent UWB signal interference in a WiMax band for a victim signal, an avoid algorithm is proposed which controls a band including a null tone among 128 IFFT-mapped tones of an ultra wideband signal to be shifted to a band where an interference with an WiMax signal occurs. In addition, there is an avoid algorithm in which a UWB device detects the strength of a received signal of a UWB communication band, and if the detected strength of the received signal is within a determined range of interference, determines that it has a possibility of interference with other devices and selects a different UWB communication frequency band.

To apply the detect and avoid technology standard, when a victim signal of a specific received signal level is detected from a UWB device, it is necessary for the UWB device to decrease its communication output or switch its communication band to another frequency band within a specific length of time. Typically, in order to detect such a victim signal of a specific level, the presence or absence of a victim signal of a specific level is detected, while the communication of the UWB device is being stopped, within a specific time range of avoidance defined by the detect and avoid technology standard. In this case, the communication of the UWB device has to be stopped to detect a victim signal at specific time intervals even when no victim signal is present, thus significantly lowering the throughput of the UWB communication device.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for detecting a victim signal during communication in an MB-OFDM UWB system, which can meet the detect and avoid technology standard.

An exemplary embodiment of the present invention provides a system for detecting a victim signal in an ultra wideband communication system, the system including: a fast Fourier transform unit that performs fast Fourier transform of a received signal including a plurality of time symbols to output a signal including a plurality of frequency symbols; a DFL (Detection Algorithm For Low Signal Noise Ratio) processor that checks and detects the presence or absence of a victim signal in a first signal corresponding to a first region of the input fast-Fourier-transformed signal; a monitor that monitors an error signal generated based on a signal obtained by performing channel compensation on the fast-Fourier-transformed signal and a signal obtained by performing symbol determination on the channel-compensated signal; and a DFH (Detection Algorithm For High Signal Noise Ratio) processor that checks and detects the presence of a victim signal in a second signal corresponding to a second region of the error signal.

An exemplary embodiment of the present invention provides a method or detecting a victim signal in an ultra wideband communication system, the method including: performing fast Fourier transform of a received signal including a plurality of time symbols to generate a signal including a plurality of frequency symbols; determining the presence or absence of a first signal in a first region of the signal including the plurality of frequency symbols, and, if a first signal is present, detecting the first signal as a first victim signal; generating an error signal based on the signal including the plurality of frequency symbols; and receiving the error signal, determining the presence or absence of a second signal in a second region of the error signal, and, if a second signal is present, detecting the second signal as a second victim signal.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements.

Hereinafter, a method for detecting a victim signal according to an exemplary embodiment of the present invention will be described with reference to the drawings.

Figure 1:
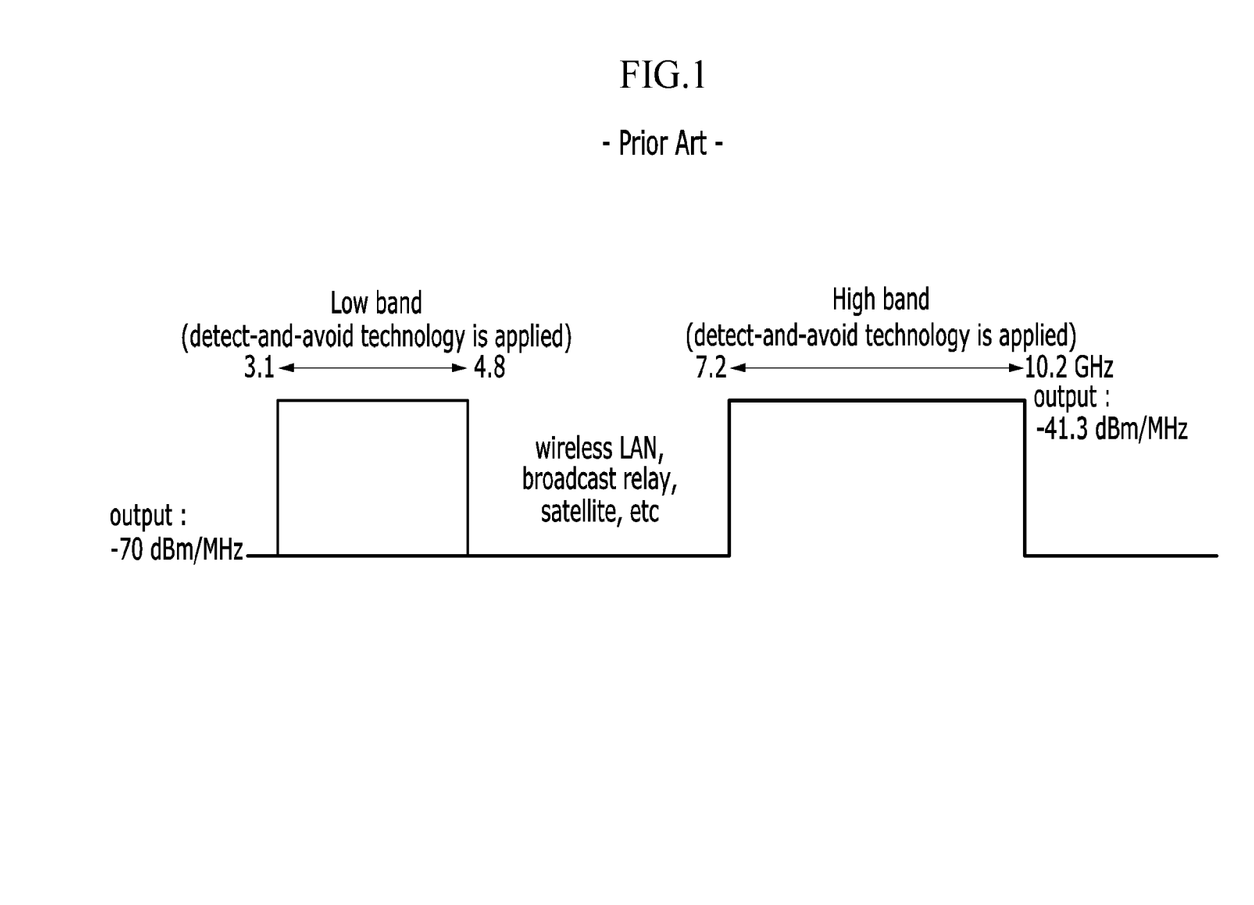
FIG. 1 is an illustration showing UWB frequency allocation to which a general detect and avoid technology standard is applied.

FIG. 1 is an illustration showing UWB frequency allocation to which a general detect and avoid technology standard is applied.

As shown in FIG. 1, the DAA (Detect And Avoid) technology standard requires that, if other wireless base station signal of a frequency band higher than a predetermined frequency band (e.g., −80 dBm/MHz) is sensed during the operation of a UWB (Ultra Wide Band) system, the frequency band is reduced to a predetermined frequency band (e.g., −70 dBm/MHz) or lower or switch to another frequency band. Examples of wireless technologies currently offering the possibility of adopt the detect and avoid technology standard in the 3100 to 4800 MHz frequency band include 4 G communication, Wibro, and WiMax.

Generally, in order to detect a victim signal of a specific level defined by the detect and avoid technology standard, the presence or absence of a victim signal of a specific level is detected, while the communication of the UWB device is being stopped, within a specific time range of avoidance. In this case, the communication of the UWB device has to be stopped to detect a victim signal at specific time interval even when no victim signal is present, and thus the throughput of the UWB communication device is lowered.

Accordingly, in the exemplary embodiment of the present invention, rather than stopping UWB communication at specific time intervals of avoidance and detecting a victim signal, the UWB communication is stopped only when a victim signal is sensed as being present during the UWB communication, and an algorithm for detecting a victim signal higher than a specific level is executed detect a victim signal. Prior to describing a victim signal detection environment for applying this algorithm, a general victim signal detection environment will be described with reference to FIG. 2.

Figure 2:
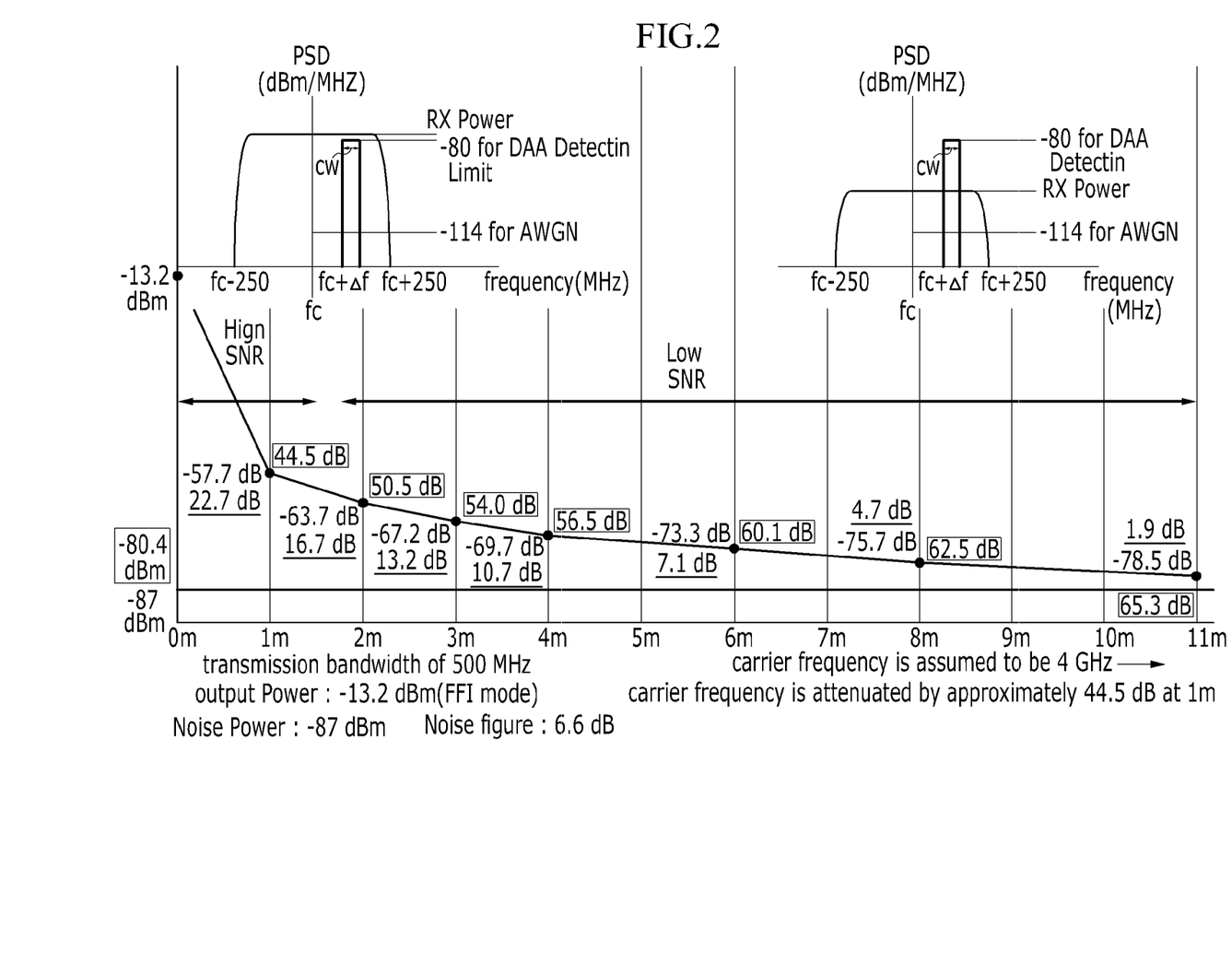
FIG. 2 is an illustration showing a victim signal detection environment using a general UWB reception SNR.

FIG. 2 is an illustration showing a victim signal detection environment using a general UWB reception SNR (signal to noise ratio). In FIG. 2, underlined numbers represent SNR and squared numbers represent loss.

As shown in FIG. 2, a communication environment of a UWB system may be divided into a low SNR region (hereinafter, referred to as a first region for convenience of description) in which the power density of a victim signal is higher than the power density of a UWB signal and a high SNR region (hereinafter, referred to as a second region for convenience of description) in which the power density of a victim signal is similar to or lower than the power density of a UWB signal.

The detection level of a victim signal is estimated to be higher than a UWB reception power in the first region located at a long distance from a transmitting end of the UWB system. Thus, the presence or absence of a victim signal can be easily determined by detecting a frequency domain signal of a received signal. On the contrary, although the SNR is high for a near distance from the transmitting end of the UWB system, the detection level of a victim signal lies below a UWB reception signal level. Thus, it is difficult to determine the presence or absence of a victim signal by a simple frequency domain estimation algorithm.

When considering an actual UWB system operation environment and the possibility of the presence of a victim signal, an algorithm for detecting a victim signal in various SNR environments is needed. Preferably, such a victim signal detection algorithm is designed to be divided into an algorithm that works in low SNR and an algorithm that works in high SNR according to SNRs. This will be described with reference to the system structure of FIG. 3.

Figure 3:
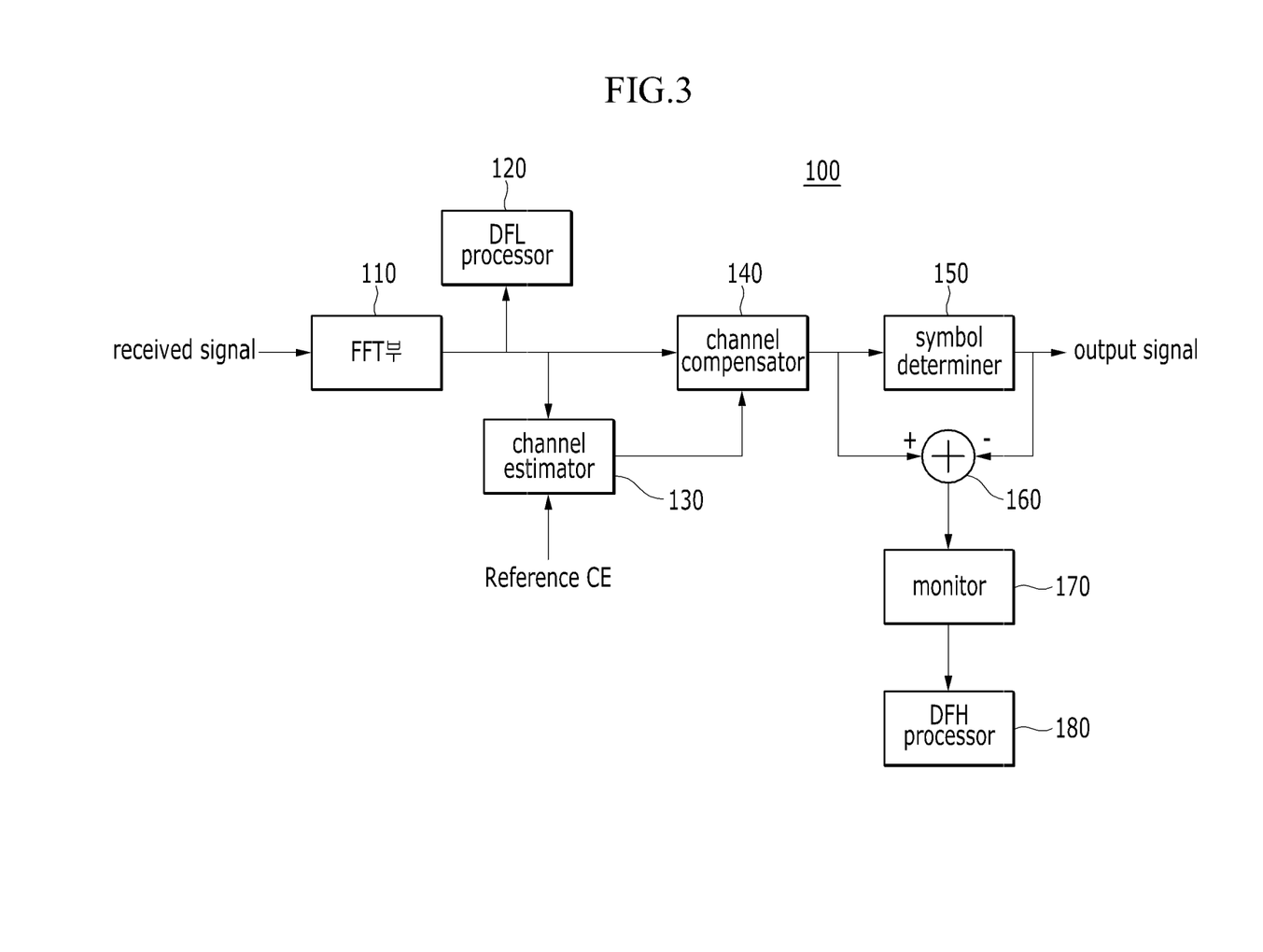
FIG. 3 is a structural diagram of a system for detecting a victim signal according to SNRs according to an exemplary embodiment of the present invention.

FIG. 3 is a structural diagram of a system for detecting a victim signal according to SNRs according to an exemplary embodiment of the present invention.

As shown in FIG. 3, a victim signal detection system 100 comprises a FFT (Fast Fourier Transform) unit 110, a DFL (Detection Algorithm For Low Signal Noise Ratio) processor 120, a channel estimator 130, a channel compensator 140, a symbol determiner 150, an adder 160, a monitor 170, and DFH (Detection Algorithm For High Signal Noise Ratio) processor 180.

The FFT unit 110 FFT-transforms an input received signal to convert a signal on a time axis into a signal on a frequency axis.

The DFL processor 120 receives a signal output from the FFT unit 110, and checks whether a victim signal is present in the received signal. Among the signals output from the FFT unit 110, only the signals (hereinafter, referred to as first signals) having a power density higher than a UWB signal power density, corresponding to the first region, are processed. In case any victim signal is present, the UWB system is stopped and a procedure subsequent to the stopping is performed. The DFL processor 120 will be described in detail later.

The channel estimator 130 estimates a channel gain by receiving a signal on a frequency axis output from the FFT unit 110 and a stored reference signal (Reference CE) and conjugating the two signals and accumulating the resulting values. The estimated channel gain is output as a channel frequency response HLS. A method of estimating a channel gain is already known, so a detailed description thereof will be omitted in the exemplary embodiment of the present invention.

The channel compensator 140 receives the channel frequency response output from the channel estimator 130 and the signal output from the FFT unit 110 and outputs a channel-compensated signal. In channel compensation, both the phase and amplitude of a signal are to be compensated by the following Equation 1. Although the exemplary embodiment of the present invention will be described taking an example in which the channel compensator 140 outputs 6 channel compensation symbols, the present invention is not necessarily limited thereto.

$$\hat{Y}=Y/\hat{H}_{LS}$$ (Equation 1)

Where $\hat{Y}$ is the output of the channel estimator 130, Y is the output signal of the FFT unit 110, $\hat{H}_{LS}$ is the channel frequency response obtained from the 6 channel compensation OFDM symbols.

The symbol determiner 150 receives the channel-compensation signal from the channel compensator 140, and determines a symbol and outputs it.

The adder 160 receives the channel-compensated signal from the channel compensator 140 and the symbol output from the symbol determiner 150, and outputs a difference value between them. That is, to detect a victim signal, the adder 160 calculates an error value between the value before symbol determination and the value after symbol determination and outputs an error signal (e(n)).

The monitor 170 maps the error signal output from the adder 160 to 128 FFT subcarrier locations in order for the DFH processor 180 to check whether a victim signal is present.

The DFH processor 180 checks whether a victim signal is present in the signal based on the signal output from the monitor 170. That is, to operate a DFH algorithm in the second region, the presence of a victim signal is checked by detecting signals (hereinafter, referred to as second signals) having a power density similar to or lower than the UWB signal power density. In case any victim signal is present, the UWB system is stopped and a procedure subsequent to the stopping is performed. The DFH processor 180 will be described in detail later.

The DFL processor 120 employing a victim signal detection algorithm for low SNR in the thus-configured victim signal detection system 100 will be described with reference to FIG. 4.

Figure 4:
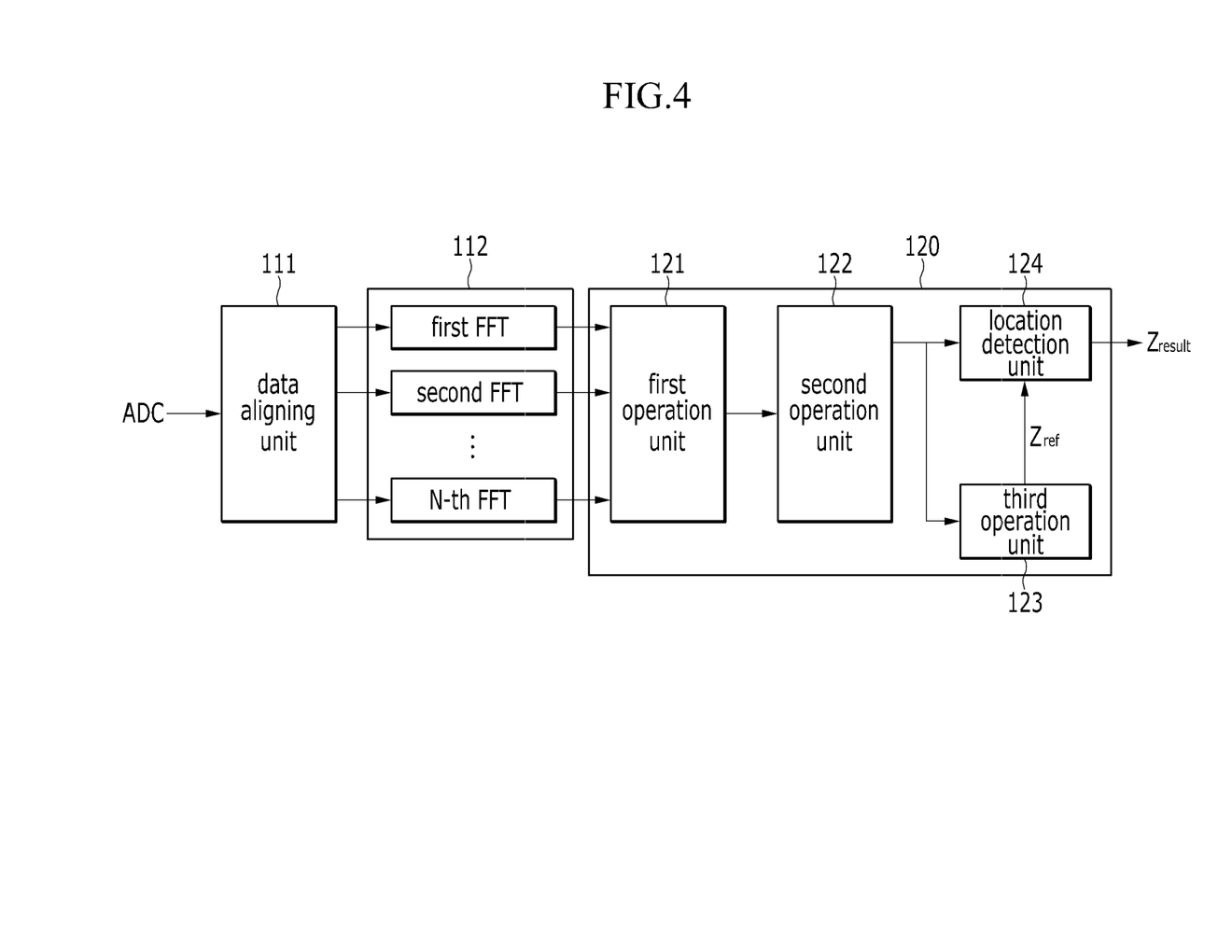
FIG. 4 is an illustration showing a structure of a system for detecting a victim signal in a first region according to an exemplary embodiment of the present invention.

FIG. 4 is a structural diagram of the DFL processor, according to an exemplary embodiment of the present invention.

As shown in FIG. 4, the DFL processor 120 according to the exemplary embodiment of the present invention which receives signals output through the FFT unit 110 and tracks the position of a subcarrier with a victim signal among a plurality of subcarriers based on a plurality of selected time symbols comprises a first operation unit 121, a second operation unit 122, a third operation unit 123, and a location detection unit 124.

The FFT unit 110 operating in conjunction with the DFL processor 120 comprises a data aligning unit 111 and a plurality of Fourier transform units 112. Although the exemplary embodiment of the present invention will be described with respect to the FFT unit 100 comprising a data aligning unit 111 and a plurality of Fourier transform units 112 for convenience of description, the present invention is not necessarily limited thereto.

The FFT unit 110 will be described first for convenience of description. The data aligning unit 111 selects a predetermined number of time symbols among a plurality of time symbols included in a digital detection signal, and outputs a plurality of selected time symbols in parallel.

The plurality of Fourier transform units 112 respectively correspond to the plurality of selected time symbols, and output a plurality of frequency symbols respectively corresponding to the plurality of selected time symbols by performing Fourier transform on each of the plurality of selected time symbols. Each of the plurality of frequency symbol comprises a plurality of frequency samples that respectively correspond to the plurality of subcarriers.

The first operation unit 121 of the DFL processor 120 adds the plurality of frequency samples corresponding to each subcarrier and outputs a plurality of, sample sums respectively corresponding to each of the plurality of subcarriers. Each of the plurality of sample sums corresponds to a complex number value.

The second operation unit 122 adds the absolute values of the real and imaginary parts of each sample sum based on the plurality of sample sums, and outputs a plurality of sample absolute values that respectively correspond to the plurality of sample sums.

The third operation unit 123 divides the sum of the plurality of sample absolute values by a value corresponding to a subcarrier detection range based on the plurality of sample absolute values to output a reference value for determining the presence or absence of a victim signal for each of the plurality of subcarriers.

The location detection unit 124 compares each of the plurality of sample absolute values with the reference value to detect a subcarrier where a victim signal is located. That is, if a sample absolute value is greater than the reference value, this indicates that a victim signal is located at the corresponding position, a subcarrier corresponding to the sample absolute value is detected and output.

In other words, first of all, an n number of 128 FFTs is performed using an MB-OFDM UWB reception structure in order to detect a subcarrier with a victim signal among 128 FFT subcarriers of an MB-OFDM UWB system. Then, the sum of the subcarriers that have performed the FFTs is obtained.

Using the sum of the 128 FFT results, the sum $Z_k$ (k=0, 2, . . . , 127) of the absolute values of the real and imaginary parts of each of the subcarriers is obtained. Then, a reference value $Z_{ref}$ to be used as a reference for determining the presence or absence of a victim signal is calculated for each subcarrier by the following Equation 2:

$$Z_{ref} = \left(\sum_{k=0}^{127} Z_k\right)/n$$ (Equation 2)

where n indicates a random number between 1 and 128.

After calculating the reference value used as the reference, the sum $Z_k$ of the absolute values obtained previously are the reference value are compared with each other for each of the 128 subcarriers to select the location of a victim signal. An example of selecting the location of a victim signal will be described with reference to FIG. 5.

Figure 5:
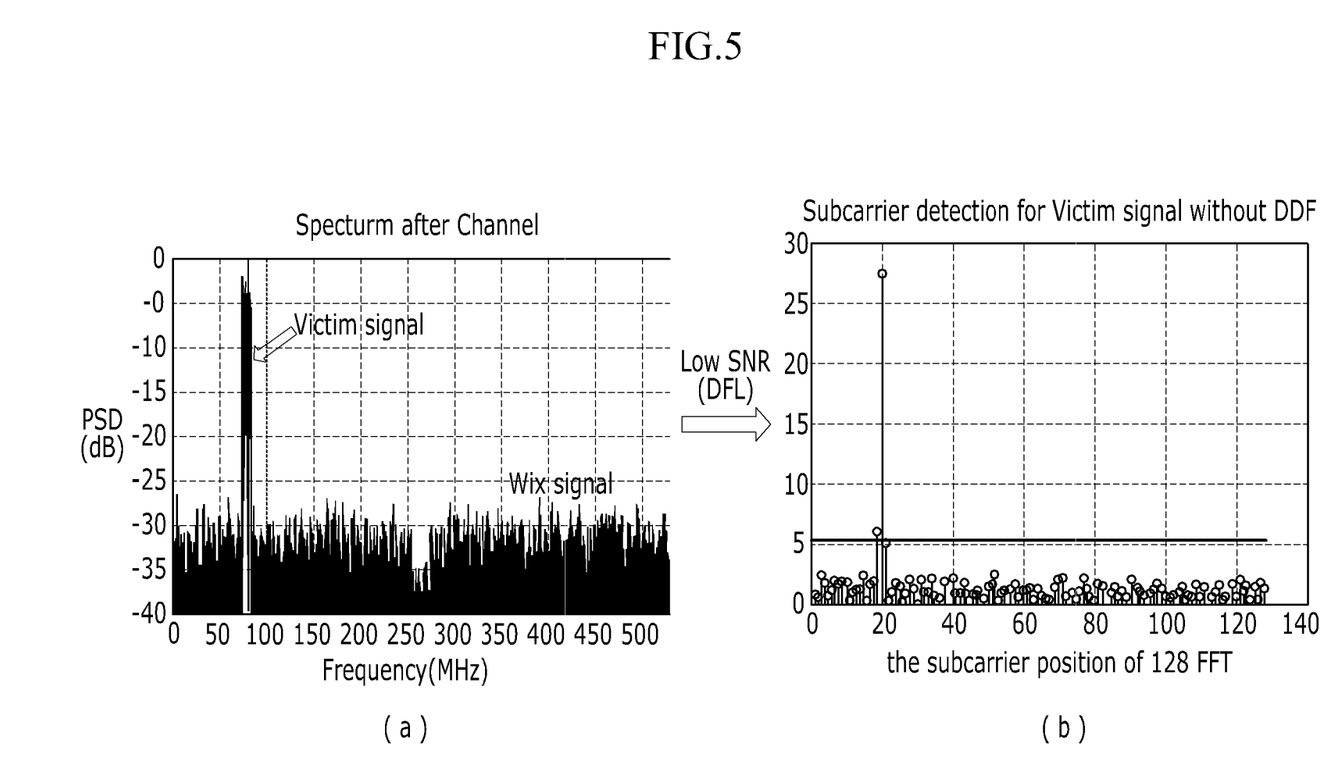
FIG. 5 is an illustration showing a simulation result of DFL application according to a first exemplary embodiment of the present invention.

FIG. 5 is an illustration showing a simulation result of DFL application according to a first exemplary embodiment of the present invention.

(a) of FIG. 5 is an illustration showing a signal in a low SNR environment among the signals passed through the FFT 110. As illustrated in (a) of FIG. 5, in a low SNR region where the power density of a victim signal is higher than the power density of a UWB signal, the location of the victim signal can be detected by applying DFL. The signal after the application of DFL is as shown in (b) of FIG. 5. That is, as illustrated in (b) of FIG. 5, the location of a subcarrier greater than the reference value is selected as the location of a victim signal.

Figure 6:
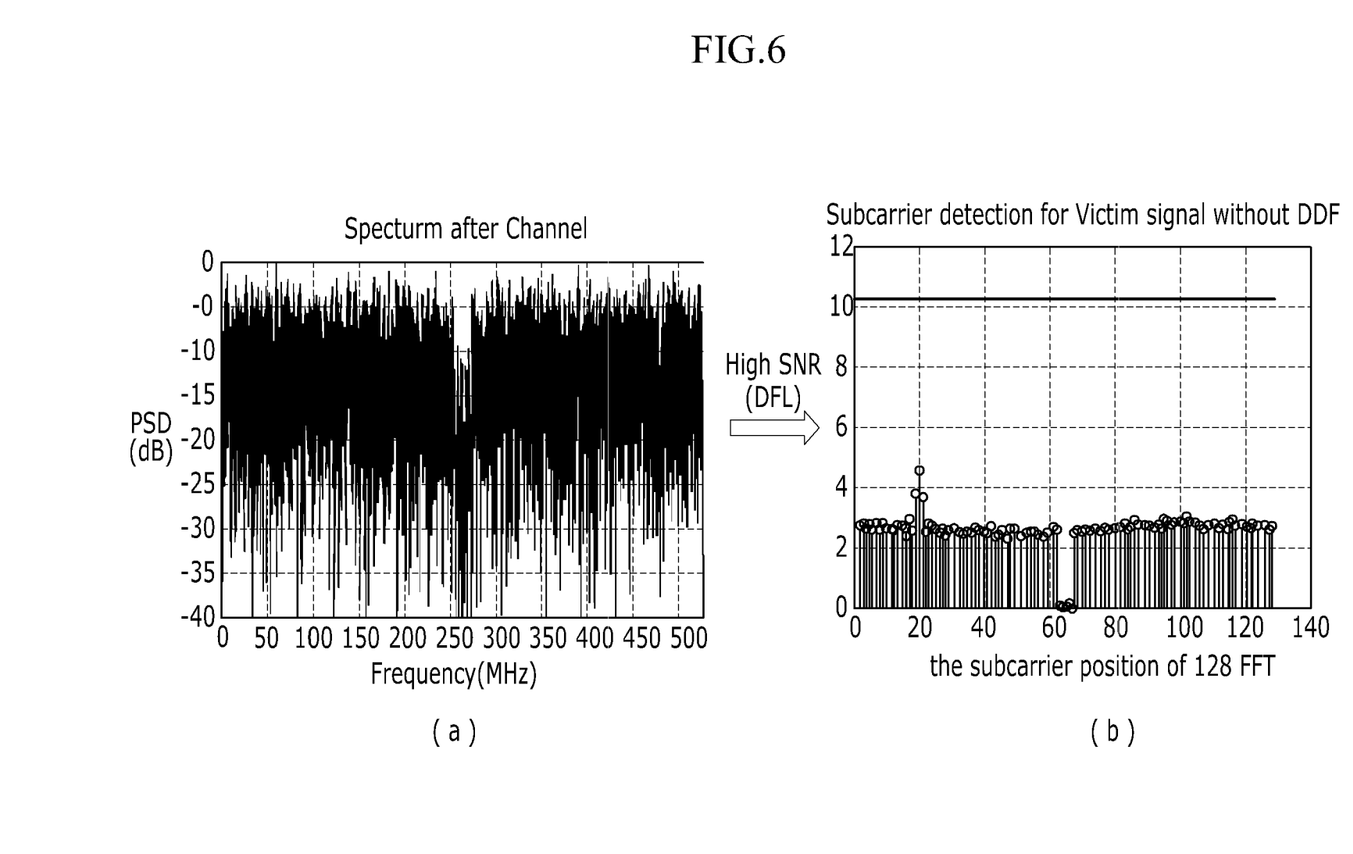
FIG. 6 is an illustration showing a simulation result of DFL application according to a second exemplary embodiment of the present invention.

FIG. 6 is an illustration showing a simulation result of DFL application according to a second exemplary embodiment of the present invention.

As illustrated in (a) of FIG. 6, under high SNR conditions, the PSD (Power Spectral Density) of a victim signal is too low, as compared to that of a UWB reception signal, so the victim signal does not appear on the spectrum, being covered by the UWB reception signal. In the case where the victim signal received in a high SNR environment is not seen, being covered by the UWB signal, if the victim signal detection algorithm DFL available at low SNR, as designed in FIG. 4, is adopted to detect a victim signal, no victim signal is detected as shown in (b) of FIG. 6.

Therefore, the DFH processor for detecting a victim signal in a high SNR environment will be described with reference to FIG. 7.

Figure 7:
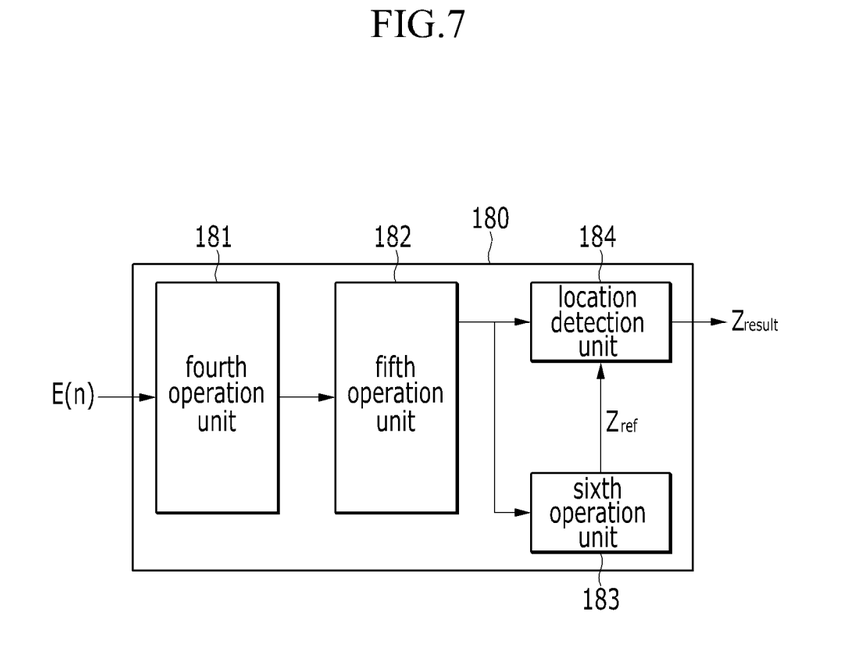
FIG. 7 is an illustration showing a victim signal detection algorithm according to the second exemplary embodiment of the present invention.

FIG. 7 is an illustration showing a structure of the DFH processor according to an exemplary embodiment of the present invention.

As shown in FIG. 7, the DFH processor 180 according to the exemplary embodiment of the present invention receives signals output from the monitor 170 and tracks the location of a subcarrier with a victim signal, and comprises a fourth operation unit 181, a fifth operation unit 182, a sixth operation unit 183, and a location detection unit 184.

The fourth operation unit 181 receives an error signal (e(n)) output from the monitor 170 of FIG. 3, and adds a plurality of frequency samples respectively corresponding to the plurality of subcarriers in an OFDM symbol, and outputs a plurality of sample sums respectively corresponding to the plurality of subcarriers. Each of the plurality of sample sums corresponds to a complex number value.

The fifth operation unit 182 adds the absolute values of the real and Imaginary parts of each sample sum based on the plurality of sample sums, and outputs a plurality of sample absolute values that respectively correspond to the plurality of sample sums.

The sixth operation unit 183 divides the sum of the plurality of sample absolute values by a value corresponding to a subcarrier detection range based on the plurality of sample absolute values to output a reference value for determining the presence or absence of a victim signal for each of the plurality of subcarriers.

The location detection unit 184 compares each of the plurality of sample absolute values with the reference value to detect a subcarrier where a victim signal is located.

That is, to detect a victim signal in a high SNR environment, the presence or absence of a victim signal is determined using a value obtained by subtracting the final determined d(n) from the signal d(n) whose l-th received symbol is channel-compensated as in Equation 3:

$$Y_{l,k} = d(n) - d(n) \quad \text{(Equation 3)}$$

where l denotes the l-th symbol, and k denotes the k-th subcarrier.

The sum of the subcarriers is obtained by using the 128 subcarrier values in the OFDM symbol obtained in Equation 3. Using the sum of the 128 FFT results, the sum $Z_k$ (k=0, 2, ..., 127) of the absolute values of the real and imaginary parts of each of the subcarriers is obtained. Then, a reference value $Z_{ref}$ to be used as a reference for determining the presence or absence of a victim signal for each subcarrier is calculated by the following Equation 4:

$$Z_{ref} = \left(\sum_{k=0}^{127} Z_k\right) / n \quad \text{(Equation 4)}$$

where n indicates a random number between 1 and 128.

After calculating the reference value used as the reference, the sum $Z_k$ of the absolute values obtained previously are the reference value are compared with each other for each of the 128 subcarriers to select the location of a victim signal. The thus-selected location of a victim signal will be described with reference to FIG. 8.

Figure 8:
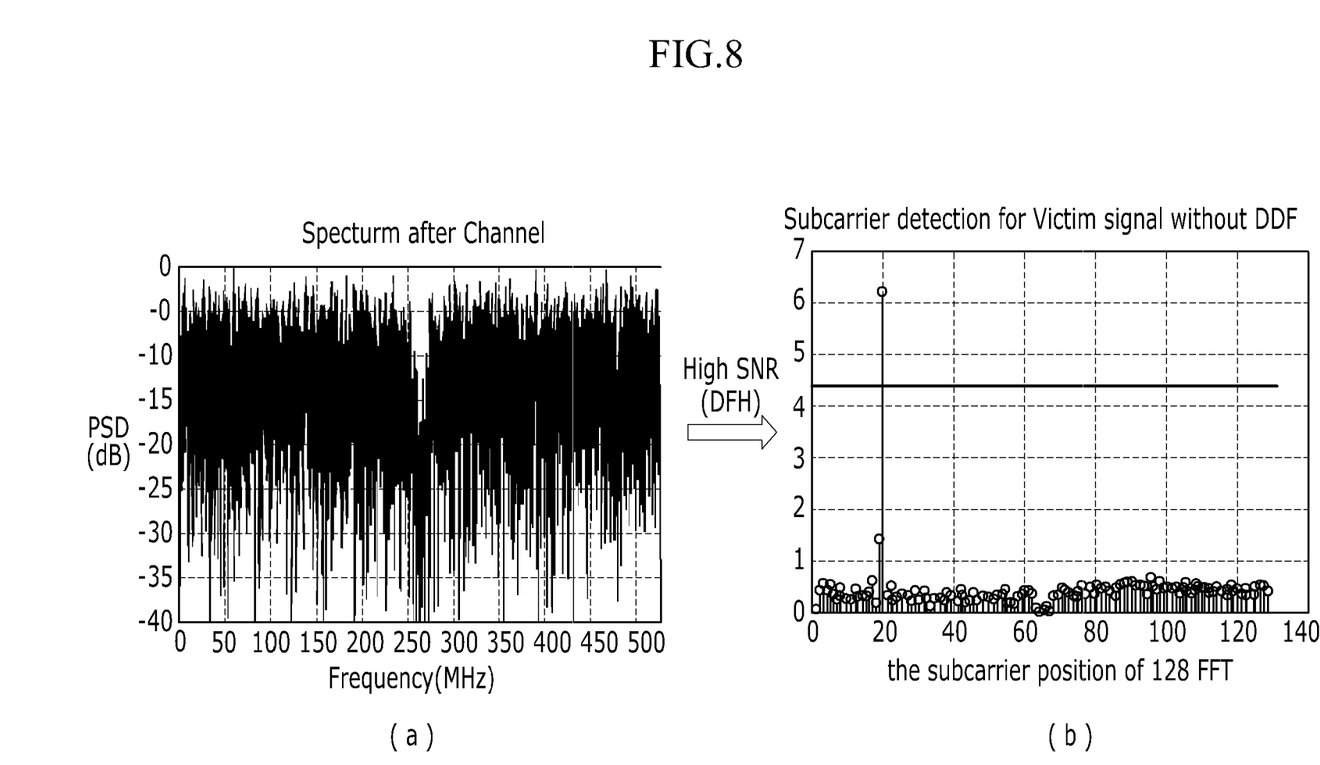
FIG. 8 is an illustration showing a simulation result of DHF application according to the second exemplary embodiment of the present invention.

FIG. 8 is an illustration showing a simulation result of DHF application according to the second exemplary embodiment of the present invention.

As shown in (a) of FIG. 8, the PSD (Power Spectral Density) of a victim signal is too low, as compared to that of a UWB reception signal, so the victim signal does not appear on the spectrum, being covered by the UWB reception signal. Accordingly, using the algorithm structure of FIG. 7, the location of a victim signal covered by a UWB signal can be detected as show in (b) of FIG. 8. That is, although it is difficult to detect a victim signal from UWB signals including a victim signal merely by performing FFT in the way DFL is performed, if the victim signal detection algorithm according to the exemplary embodiment of the present invention is used, the location of a victim signal can be accurately detected as shown in (b) of FIG. 8.

Next, to exhibit the performance of the victim signal detection algorithm during UWB communication, the performances of DFL and DFH under an SNR environment of −6 dB to 48 dB will be described with reference to FIG. 9.

Figure 9:
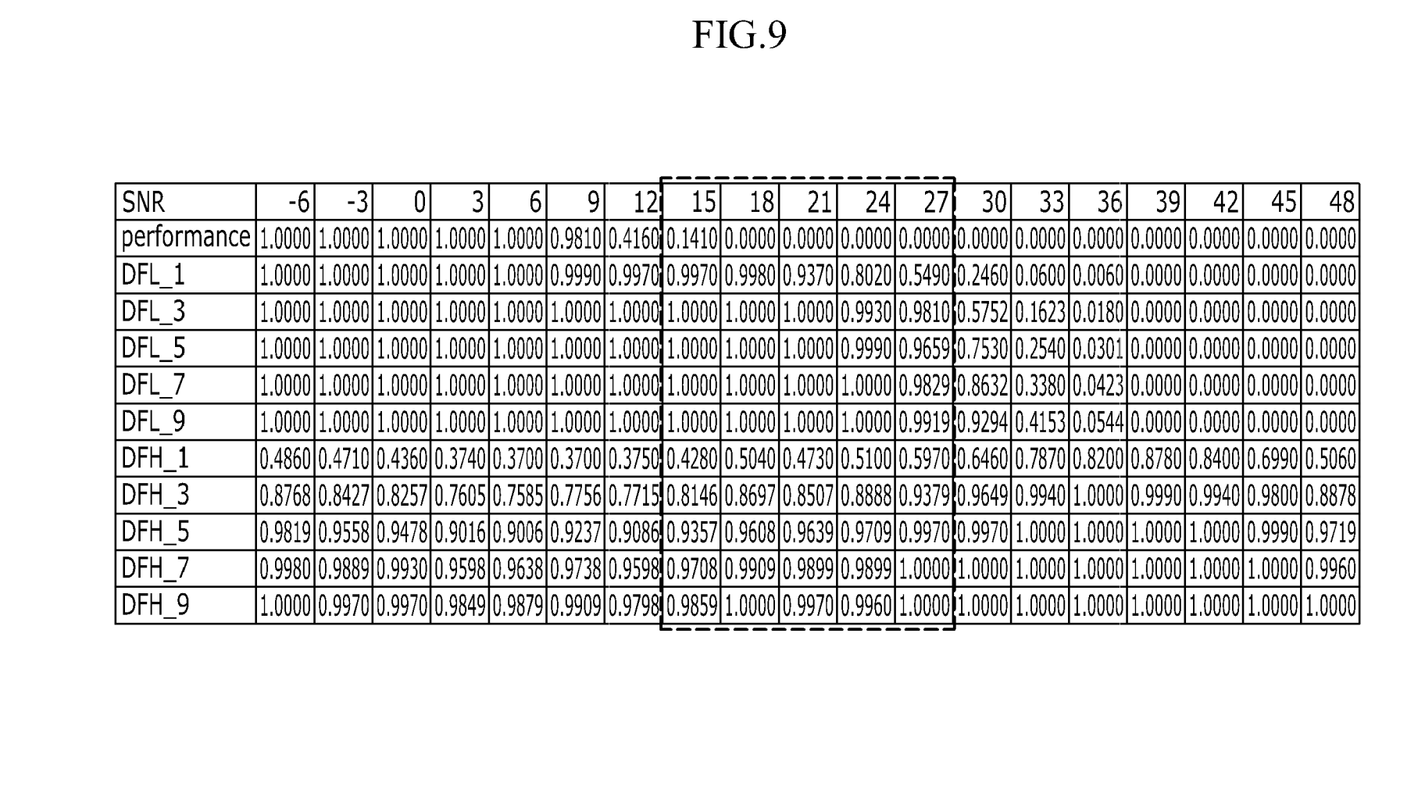
FIG. 9 is an illustration showing the performance of the victim signal detection algorithm according to an exemplary embodiment of the present invention.

FIG. 9 is an illustration showing the performance of the victim signal detection algorithm according to an exemplary embodiment of the present invention.

It is assumed that the channel environment is set to an AWGN (Additive White Gaussian Noise) condition, and a victim signal is received at −70 dBm in a 10 MHz bandwidth. A number (e.g., DFL_9) of FIG. 9 represents the number of packets used for performance evaluation, and 12 PLCP (Packet Layer Convergence Procedure) header OFDM symbols are used to evaluate the performance of the victim signal detection algorithm regardless of the data transmission rate of UWB communication.

As shown in FIG. 9, as the detection ranges of DFL and DFH overlap widely, it can be found out that a victim signal can be detected over the entire SNR range during UWB communication by using both of the two algorithms.

Next, a method for detecting a victim signal by the victim signal detection system 100 will be described with reference to FIGS. 10A and 10B.

Figure 10A:
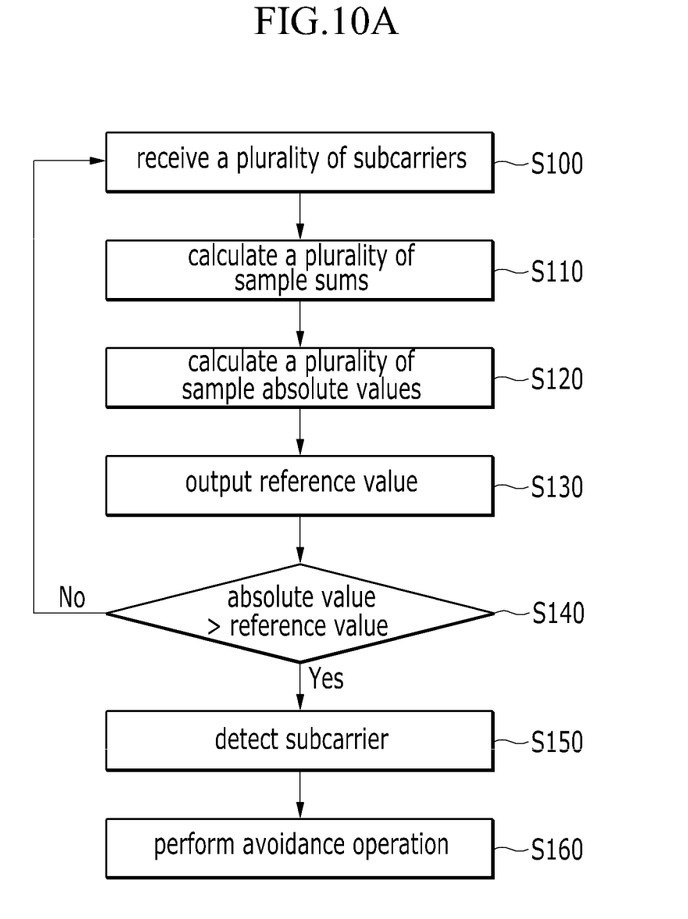
FIG. 10A and FIG. 10B are flowcharts showing a method for detecting a victim signal according to an exemplary embodiment of the present invention.
Figure 10B:
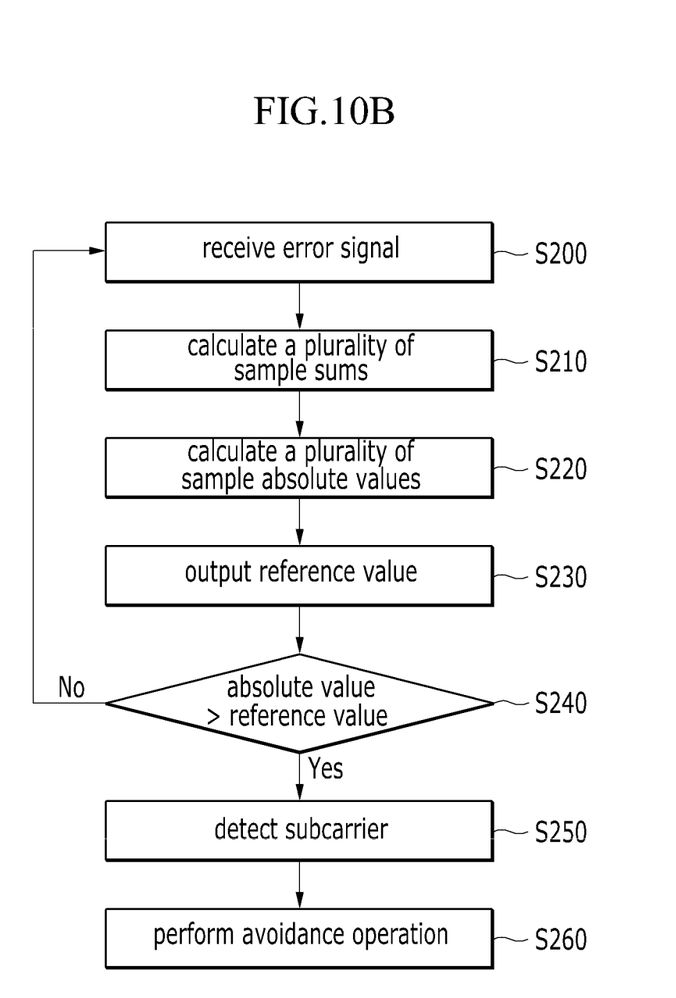

FIG. 10A and FIG. 10B are flowcharts showing a method for detecting a victim signal according to an exemplary embodiment of the present invention.

FIG. 10A is a flowchart showing a method for detecting a victim signal by the DFL processor 120, and FIG. 10B is a flowchart showing a method for detecting a victim signal by the DFH processor 180. The DFL processor 120 and the DFH processor 180 operate independently, rather than operating in conjunction with each other, such that upon detecting a victim signal by any one of the processors, the operation of the UWB system is stopped to proceed to the subsequent procedure. In the exemplary embodiment of the present invention, the description of the procedure subsequent to the detection of a victim signal will be omitted.

First, as illustrated in FIG. 10A, a plurality of Fourier transform units 112 of the FFT unit 110 perform Fourier transform of a received signal and output the signal. Each of a plurality of frequency symbols output at this time comprises a plurality of frequency samples respectively corresponding to the plurality of subcarriers.

The first operation unit 121 receives subcarriers serving as a plurality of signals output from the FFT unit 110 (S100), and adds the plurality of frequency samples respectively corresponding to each subcarrier based on each of the plurality of frequency symbols, and obtains a plurality of sample sums (S110). A sample value is a complex number value consisting of real and imaginary parts. Accordingly, the plurality of sample sums obtained in the step S110 are calculated as a plurality of sample absolute values obtained by adding the absolute values of real and imaginary parts by the second operation unit 122 (S120).

The third operation unit 123 outputs a reference value for determining the presence or absence of a victim signal based on the plurality of subcarriers (S130). Then, the location detection unit 124 compares each of the plurality of sample absolute values calculated in the step S120 with the reference value output in the step S130 (S140), and detects a subcarrier where a victim signal is located as well as the presence or absence of a victim signal (S150).

That is, if a sample absolute value is greater than the reference value, this indicates that a victim signal is present in the corresponding sample, a subcarrier corresponding to the sample is detected. However, if the sample absolute value is less than the reference value, this indicates that no victim signal is present in the corresponding sample, and hence the procedure is performed again starting from the step S100.

When a subcarrier where a victim signal is located is detected, an avoidance operation for protecting the victim signal is (S160). As the avoidance operation is already known, the detailed description thereof will be omitted in the exemplary embodiment of the present invention. The thus-detected subcarrier is in the location of a victim signal present within a first signal having a higher power density than the power density of a UWB signal.

On the other hand, when a victim signal is present within a second signal having a power density similar to or lower than the power density of the UWB signal, the victim signal is detected in the same procedure as shown in FIG. 10B.

That is, the fourth operation unit 181 receives an error signal output from the monitor 170 (S200). The error signal (e(n)) is an error value between the values before and after symbol determination by the adder 160.

The plurality of frequency samples 128 respectively corresponding to each subcarrier are added together based on each of the plurality of frequency symbols aligned in units of 128 subcarriers to obtain a plurality of sample sums (S210). A sample value is a complex number value consisting of real and imaginary parts. The plurality of sample sums obtained in the step S210 are calculated as a plurality of sample absolute values obtained by adding the absolute values of real and imaginary parts by the fifth operation unit 182 (S220).

The sixth operation unit 183 outputs a reference value for determining the presence or absence of a victim signal based on the plurality of subcarriers (S230). Then, the location detection unit 184 compares each of the plurality of sample absolute values calculated in the step S220 with the reference value output in the step S230 (S240), and detects a subcarrier where a victim signal is located, as well as the presence or absence of a victim signal (S250).

That is, if a sample absolute value is greater than the reference value, this indicates that a victim signal is present in the corresponding sample, a subcarrier corresponding to the sample is detected. However, if the sample absolute value is less than the reference value, this indicates that no victim signal is present in the corresponding sample, and hence the procedure is performed again starting from the step S200.

When a subcarrier where a victim signal is located is detected, an avoidance operation for protecting the victim signal is (S260). As the avoidance operation is already known, the detailed description thereof will be omitted in the exemplary embodiment of the present invention.

According to an exemplary embodiment of the present invention, throughput can be guaranteed in the case of absence of a victim signal by stopping UWB communication and performing a victim signal detection algorithm only when a UWB device has detected the presence of a victim signal during UWB communication.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for detecting a victim signal in an ultra wide-band communication system, the system comprising:
    a fast Fourier transform unit that performs fast Fourier transform of a received signal including a plurality of time symbols to output a signal including a plurality of frequency symbols;
    a DFL (Detection Algorithm For Low Signal Noise Ratio) processor that checks and detects the presence of a victim signal in a first signal corresponding to a first region of the input fast-Fourier-transformed signal;
    a monitor that monitors an error signal generated based on a signal obtained by performing channel compensation on the fast-Fourier-transformed signal and a signal obtained by performing symbol determination on the channel-compensated signal; and
    a DFH (Detection Algorithm For High Signal Noise Ratio) processor that checks and detects the presence of a victim signal in a second signal corresponding to a second region of the error signal.

2. The system of claim 1, wherein each of the plurality of frequency symbols comprises a plurality of frequency samples respectively corresponding to a plurality of subcarriers, and
    the DFL processor comprises:
    a first operation unit that adds the plurality of frequency samples respectively corresponding to each subcarrier based on each of the plurality of frequency symbols, and outputs a plurality of sample sums respectively corresponding to the plurality of subcarriers;
    a second operation unit that adds the absolute values of the real and imaginary parts of each sample sum based on the plurality of sample sums, and outputs a plurality of sample absolute values that respectively correspond to the plurality of sample sums;
    a third operation unit that divides the sum of the plurality of sample absolute values by a predetermined subcarrier detection range value based on the plurality of sample absolute values to output a reference value;
    a location detection unit that compares each of the plurality of sample absolute values with the reference value to generate information on where a victim signal is located.

3. The system of claim 2, wherein the first region is a region in which the power density of a victim signal is higher than the power density of a received signal, and the first signal has a higher power density than the received signal power density in the first region.

4. The system of claim 1, wherein the error signal comprises a plurality of frequency samples respectively corresponding to a plurality of subcarriers, and
the DFH processor comprises:
a fourth operation unit that adds the plurality of frequency samples respectively corresponding to each subcarrier based on each of the plurality of frequency symbols, and outputs a plurality of sample sums respectively corresponding to the plurality of subcarriers;
a fifth operation unit that adds the absolute values of the real and imaginary parts of each sample sum based on the plurality of sample sums, and outputs a plurality of sample absolute values that respectively correspond to the plurality of sample sums;
a sixth operation unit that divides the sum of the plurality of sample absolute values by a predetermined subcarrier detection range value based on the plurality of sample absolute values to output a reference value; and
a location detection unit that compares each of the plurality of sample absolute values with the reference value to generate information on where a victim signal is located.

5. The system of claim 4, wherein the second region is a region in which the power density of a victim signal is similar to or lower than the power density of a received signal, and the second signal has a power density similar to or lower than the received signal power density in the second region.

6. The system of claim 1, comprising:
a channel estimator that estimates a channel gain by receiving a signal output from the FFT unit and a stored reference signal and conjugating the output signal and the reference signal and accumulating the resulting values, and outputs a channel frequency response; and
a channel compensator that receives the channel frequency response output from the channel estimator and the signal output from the FFT unit and outputs a channel-compensated signal.

7. The system of claim 6, wherein the channel compensator compensates for both the phase and amplitude of a signal.

8. The system of claim 6, further comprising:
a symbol determiner that receives the channel-compensation signal from the channel compensator and determines a symbol;
an adder that receives the channel-compensated signal from the channel compensator and the symbol output from the symbol determiner, and outputs a difference value between the signal and the symbol as an error signal.

9. A method for detecting a victim signal in an ultra wideband communication system,
performing fast Fourier transform (FFT) of a received signal including a plurality of time symbols to generate a signal including a plurality of frequency symbols;
determining the presence or absence of a first signal in a first region of the signal including the plurality of frequency symbols, and, if a first signal is present, detecting the first signal as a first victim signal;
generating an error signal based on the signal, wherein the generated error signal is obtained by performing channel compensation on both the FFT of the received signal and another signal obtained by performing symbol determination on the channel compensated signal, including the plurality of frequency symbols; and
receiving the error signal, determining the presence or absence of a second signal in a second region of the error signal, and, if a second signal is present, detecting the second signal as a second victim signal.

10. The method of claim 9, wherein each of the plurality of frequency symbols comprises a plurality of frequency samples respectively corresponding to a plurality of subcarriers, and
the detecting of the first victim signal comprises:
adding the plurality of frequency samples respectively corresponding to each subcarrier based on each of the plurality of frequency symbols, and outputting a plurality of sample sums respectively corresponding to the plurality of subcarriers;
adding the absolute values of the real and imaginary parts of each sample sum based on the plurality of sample sums, and outputting a plurality of sample absolute values that respectively correspond to the plurality of sample sums;
dividing the sum of the plurality of sample absolute values by a predetermined subcarrier detection range value based on the plurality of sample absolute values to output a reference value; and
comparing each of the plurality of sample absolute values with the reference value to generate the location information of the first victim signal.

11. The method of claim 9, wherein the error signal comprises a plurality of frequency samples respectively corresponding to a plurality of subcarriers, and
the detecting of the second victim signal, wherein the second victim signal is responsive to the generated error signal and comprises:
adding the plurality of frequency samples respectively corresponding to each subcarrier based on each of the plurality of frequency symbols, and outputting a plurality of sample sums respectively corresponding to the plurality of subcarriers;
adding the absolute values of the real and imaginary parts of each sample sum based on the plurality of sample sums, and outputting a plurality of sample absolute values that respectively correspond to the plurality of sample sums;
dividing the sum of the plurality of sample absolute values by a predetermined subcarrier detection range value based on the plurality of sample absolute values to output a reference value; and
comparing each of the plurality of sample absolute values with the reference value to generate the location information of the second victim signal.

12. The method of claim 10, further comprising, after the generating of the location information, performing an avoidance operation for protecting the first victim signal or the second victim signal.

13. The method of claim 11, further comprising, after the generating of the location information, performing an avoidance operation for protecting the first victim signal or the second victim signal.

14. The method of claim 9, wherein the generating of the error signal comprises:
estimating a channel gain by receiving a signal output from the FFT unit and a stored reference signal and conjugating the output signal and the reference signal and accumulating the resulting values, and outputting a channel frequency response; and
outputting a channel-compensated signal based on the channel frequency response and the fast-Fourier-transformed signal;
receiving the channel-compensated signal and determining a symbol; and receiving the channel-compensated signal and the symbol output from the symbol determiner, and outputting a difference value between the signal and the symbol as an error signal.

15. The method of claim 14, wherein, in the outputting of the channel-compensated signal, the fast-Fourier-transformed signal is divided by the channel frequency response to output the channel-compensated signal.

* * * * *